US011625860B1

(12) United States Patent
Cheng et al.

(10) Patent No.: US 11,625,860 B1
(45) Date of Patent: Apr. 11, 2023

(54) CAMERA CALIBRATION METHOD

(71) Applicant: Hong Kong Applied Science And Technology Research Institute Co., Ltd., Shatin (HK)

(72) Inventors: Ho Man Cheng, Shatin (HK); Yao Cheng Liang, Shatin (HK); Ka Ho Mui, Kowloon (HK)

(73) Assignee: Hong Kong Applied Science And Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 17/467,664

(22) Filed: Sep. 7, 2021

(51) Int. Cl.
*G06T 7/80* (2017.01)
*G06T 7/60* (2017.01)
*G06T 7/73* (2017.01)

(52) U.S. Cl.
CPC .................. *G06T 7/80* (2017.01); *G06T 7/74* (2017.01); *G06T 2207/10032* (2013.01); *G06T 2207/30244* (2013.01)

(58) Field of Classification Search
None
See application file for complete search history.

(56) References Cited

U.S. PATENT DOCUMENTS

| 8,934,008 B2 | 1/2015 | Rudin et al. |
| 9,679,382 B2 | 6/2017 | Zalmanson et al. |
| 2010/0321489 A1 | 12/2010 | Chen et al. |
| 2011/0169946 A1* | 7/2011 | Rudin .................. G06T 7/30 348/135 |
| 2020/0151908 A1 | 5/2020 | Zhang et al. |
| 2022/0108522 A1* | 4/2022 | Haramaty ............... G06T 17/05 |

FOREIGN PATENT DOCUMENTS

| CN | 110542407 A | 12/2019 |
| CN | 110782524 A | 2/2020 |
| CN | 111461994 A | 7/2020 |
| JP | 2001264037 A | 9/2001 |
| WO | 2014068073 A1 | 5/2014 |

OTHER PUBLICATIONS

Riggs, J., "Coordinate Transformations via Euler Angle Rotations", Coordinate Rotation Derivations, Rev E 2019, pp. 1-7.
Doerry, A. et al., "Stripmap SAR Data Collection Geometry on a Round Earth", Sandia Report, Sandia National Laboratories, Dec. 2020.

* cited by examiner

*Primary Examiner* — Samuel D Fereja
(74) *Attorney, Agent, or Firm* — GableGotwals

(57) ABSTRACT

Described is a method of calibrating a camera. The method comprises obtaining geographical coordinates of a selected physical point location within an image view of the camera and measuring an angle between an x-axis of a real-world coordinate system passing through said selected point location with respect to true north. The method includes using said obtained geographical coordinates, said measured angle, and projection data derived from characteristics of the camera to derive modified projection data for transforming a two-dimensional pixel coordinate system of the camera image view into a three-dimensional geographical coordinate system for point locations within the image view of the camera.

12 Claims, 7 Drawing Sheets

CAMERA CALIBRATION METHOD

FIELD OF THE INVENTION

The invention relates to a camera calibration method to obtain absolute position coordinates for objects within an image view of the camera or in an image captured by the camera.

BACKGROUND OF THE INVENTION

Cameras are widely installed for performing different kinds of smart city applications, for example, human/vehicle tracking, generating traffic statistics, vehicle speed detection, etc. Visual positioning is a technology that can provide geo-locations of objects in an area of interest by using image views or images captured by roadside cameras. Many applications, such as autonomous vehicle control and automatic vehicle parking, etc., can be further developed using detected geo-locations of objects in the area of interest. Increasing positioning accuracy and decreasing cost is enhancing the demand for such visual positioning. systems, especially in smart city environments. However, known camera calibration algorithms often exhibit one or more of the following issues such as that the camera needs to have a movable field of view or that two or more cameras are required for coverage of a same area. Other issues that may arise are that the outputted position data or coordinates for observed objects are relative to a camera frame of reference rather than absolute position coordinates such as global position geographical coordinates. Furthermore, the known calibration methods can be difficult to implement and time consuming with poor accuracy in determining relative position coordinates for observed objects.

WO2014/068073 discloses an optical measuring device for determining three-dimensional (3D) coordinates of an object. The measuring device comprises a projector device for illuminating: the object with at least one predefined pattern; at least one camera for capturing a two-dimensional (2D) image of the pattern as reflected from the object; computing means for measuring a sequence of brightness values of at least one 2D image point from the 2D images; and calculating a 3D coordinate of an object point which is correlated with the measured sequence of brightness values of the 2D image point. The outputted 3D coordinates are relative coordinates and more than one camera is required to determine 3D position coordinates for an observed object.

U.S. Pat. No. 9,679,382 describes a method of geo-referencing a first image of a scene acquired from a first imaging device based on at least one second image of the scene acquired from a second imaging device. The method includes obtaining data indicative of an eligibility parameter for one or more areas of the scene; selecting one or more pivot areas among the one or more areas of the scene, wherein the eligibility parameter of the pivot areas satisfy a. predefined criterion; for at least some of the selected pivot areas, identifying tie points for the first and second images; and solving the external orientation of the first image using the identified tie points and a first imaging device model. Once again, more than one camera is required for this system and a digital elevation model (DEM) map is required which is time consuming to obtain or to generate.

U.S. Pat. No. 8,934,008 discloses a method for determining geo-location(s) in images. The calibration is performed by using multiple images captured from separate locations.

CN111461994 discloses a method to get pixel location of a reference point in an image and to obtain the absolute coordinate by using a transformation matrix based on global positioning system (GPS) data of the camera.

The publication entitled "Coordinate Rotation Derivations Rev E Coordinate Transformations via Euler Angle Rotations" by J. Riggs published on 10 Apr. 2019 describes an example of a rotation matrix for rotating along an axis by an angle. It also discloses transformation from the North-East-Down (NED) coordinate system to the Earth-centred Earth fixed (ECEF) coordinate system.

The publication entitled "Stripmap SAR Data Collection Geometry on a Round Earth" published by Sandia. National Laboratories in December 2020 describes an example of transformation from the ECEF coordinate system to an absolute coordinate system, e.g., the World Geodetic System 1984 (WGS84).

What is desired is an improved camera calibration method to obtain absolute coordinates with high accuracy.

Objects of the Invention

An object of the invention is to mitigate or obviate to some degree one or more problems associated with known methods of camera calibration for determining object positions.

The above object is met by the combination of features of the main claims; the sub-claims disclose further advantageous embodiments of the invention.

Another object of the invention is to provide a novel camera system.

Another object of the invention is to provide a method of obtaining absolute position coordinates for objects in an image view of a camera.

One skilled in the art will derive from the following description other objects of the invention. Therefore, the foregoing statements of object are not exhaustive and serve merely to illustrate some of the many objects of the present invention.

SUMMARY OF THE INVENTION

The invention generally relates to a method of calibrating a camera and to a method of using image data from the camera to determine absolute position coordinates for objects within the camera image view. The method comprises obtaining geographical coordinates of a selected physical point location within an image view of the camera and measuring an angle between an x-axis of a real-world coordinate system passing through said selected point location with respect to true north. The method includes using said obtained geographical coordinates, said measured angle, and projection data derived from characteristics of the camera to derive modified projection data for transforming a two-dimensional pixel coordinate system of the camera image view or image data into a three-dimensional geographical coordinate system for point locations within the image view or image data of the camera. The transformation is one-to-one based on the assumption that all the objects are lying on the Z=0 plane of the real-world coordinate system.

In a first main aspect, the invention provides a method of calibrating a camera comprising the steps of: obtaining geographical coordinates of a selected point location within an image view of the camera; measuring an angle between an x-axis of a real-world coordinate system with respect to true north, said x-axis passing through said selected point location; and using said obtained geographical coordinates, said measured angle, and projection data derived from characteristics of the camera to derive modified projection data for transforming a two-dimensional pixel coordinate system of the camera image view into a three-dimensional geographical coordinate system for point locations within the image view of the camera.

In a second main aspect, the invention provides a camera comprising: a memory storing machine-readable instructions; and a processor for executing the machine-readable instructions such that, when the processor executes the machine-readable instructions, it configures the camera to: receive data comprising geographical coordinates of a selected point location within an image view of the camera; receive data comprising a measured angle between an x-axis of a real-world coordinate system with respect to true north, said x-axis passing through said selected point location; and using said received data comprising the geographical coordinates, said received data comprising the measured angle, and projection data derived from characteristics of the camera to derive modified projection data for transforming a two-dimensional pixel coordinate system of the camera image view into a three-dimensional geographical coordinate system for point locations within the image view of the camera.

In a third main aspect, the invention provides a method of determining geographical coordinates for a point location within an image view of a camera comprising the steps of: obtaining an image from the camera; selecting a point location in the image; obtaining two-dimensional pixel coordinates for said selected point location in the image; and transforming said two-dimensional pixel coordinates for said selected point location in the image into three-dimensional geographical coordinates for said selected point location using projection data mapping a two-dimensional pixel coordinate system of the camera image view into a three-dimensional geographical coordinate system.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
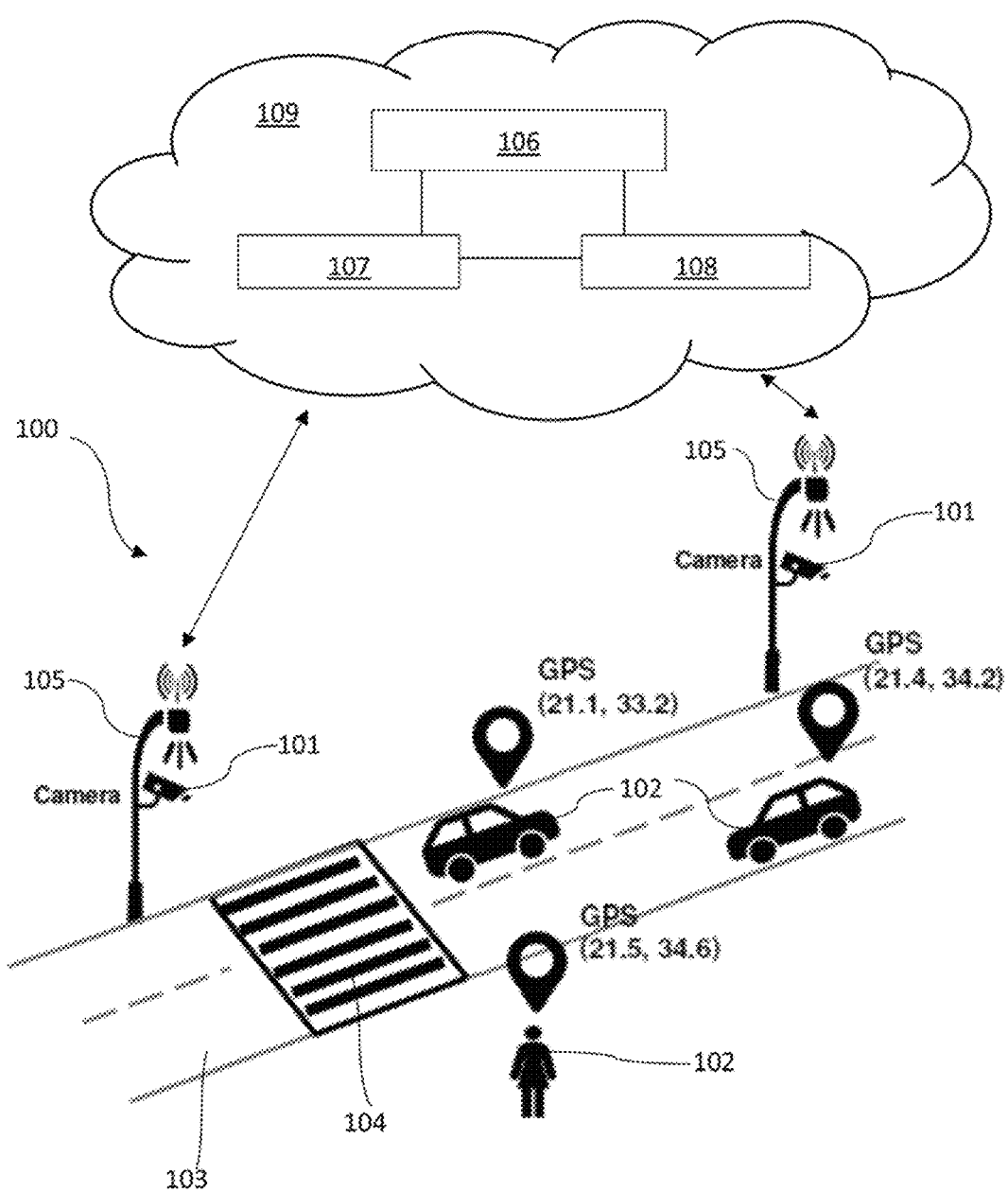
FIG. 1 is a block schematic diagram of a smart city scene in which cameras in accordance with the invention can implement the methods of the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software, or combinations thereof. These elements may be implemented in a combination of hardware and software on one or more appropriately programmed general-purpose devices, which may include a processor, a memory and input output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

One of the most common sensors used in smart city developments are surveillance cameras. Millions of such cameras are being installed in cities and towns worldwide to perform functions such as human/vehicle tracking and positioning, speed detection, providing data to vehicles and pedestrians though suitably enabled electronic devices, providing data to central control systems, etc. Such surveillance cameras can be usefully used to assist in traffic control and policing, pedestrian safely, and automatic vehicle parking to identify but a few of their functions. However, some of these functions require the vehicle and/or pedestrian position data to be highly accurate within a frame of reference. In many existing systems, the camera relative frame of reference providing position data for vehicles and/or pedestrians which are relative to the position of the camera rather than absolute position data such as global position system geographical coordinates. The usefulness of such surveillance cameras is greatly enhanced if they are adapted to provide absolute position data for vehicles and/or pedestrians or for any objects falling within the view of the camera.

One of the difficulties in achieving the aforesaid objective is the difficulty of calibrating such a camera to provide absolute position data for objects in the camera image view.

In one of its main aspects, the present invention provides a novel and simple method for calibrating the relationship between a real-world coordinate system in the locality of the camera with an absolute coordinate system such as a three-dimensional geographical coordinate system. This in turn enables a 2D pixel coordinate system of the camera image view to be calibrated to three-dimensional geographical coordinate system, an absolute positioning system.

The method may include calibrating one or both of the intrinsic characteristics of the camera and the extrinsic characteristics of the camera if these are not already known.

Furthermore, the method may include verifying the calibration results using a novel and simple method requiring nothing more than the same tools used for the main calibration step of the method.

The main aim of the method of the first main aspect of the invention is to transform the 2D pixel coordinate system of the camera image view into the 3D geographical coordinate system for any selected point locations lying in a plane such as the ground within the image view of the camera.

FIG. 1 comprises a smart city scene 100 in which one or more cameras 101 are suitably enabled in accordance with the invention to capture and provide image data from which absolute position data, e.g., global positioning system (GPS) data or the like, for objects 102 within the camera views can be obtained. Each camera 101 has a specified camera view, e.g., field of view (FOV) of a part of the city scene 100, which in this instance comprises a highway 103 with a pedestrian crossing 104.

In the example of FIG. 1, the cameras 101 are mounted on street-lamps 105 but it will be understood that the cameras 101 could be mounted on any suitable structures including buildings, etc. The camera views may overlap although this is not essential, but camera overlapping areas are useful for cross camera object identification and tracking. Each camera 101 is adapted to obtain image data of its respective camera image view from which absolute position data can be obtained for the objects 102 located within the camera's image view. Each camera 101 may be enabled with object recognition software to enable it to recognize and classify objects 102 within its camera view but that is not the focus of the present invention. Each camera 101 is preferably enabled to select a point location on each object 102 lying in a plane, for example, the ground within its camera view for which absolute position data can be obtained from the camera image data. Preferably, point locations are selected at the base of an end of an object 102 nearest the camera 101 and centrally of said object's base, the absolute position data for said selected point location represents the absolute location of the object 102.

Each camera 101 may be enabled to determine by itself the absolute position data for each object 102 within its camera view and to report said data to other entities in the smart city system such as reporting said data to vehicle based electronic devices, pedestrian handheld electronic devices, other system sensors including other cameras 101, system gateways (not shown) and one or more system central controllers 106. Additionally, or alternatively, the cameras 101 may each be linked to a system server 107 and a database 108 by a suitable communication network 109 such as an Ethernet network with the cameras 101 being enabled to provide camera image data via, for example, real-time encoded video streams using a video compression method such as the known video compression standard for high-definition digital video identified as "H.264" to the server 107 and/or the database 108. The server 107 may be configured to determine the absolute position data for objects 102 within the camera views from the camera image data provided by the various cameras 101, to store said absolute position data in the database 108, and to communicate said absolute position data as required to the other smart city system entities.

Figure 2:
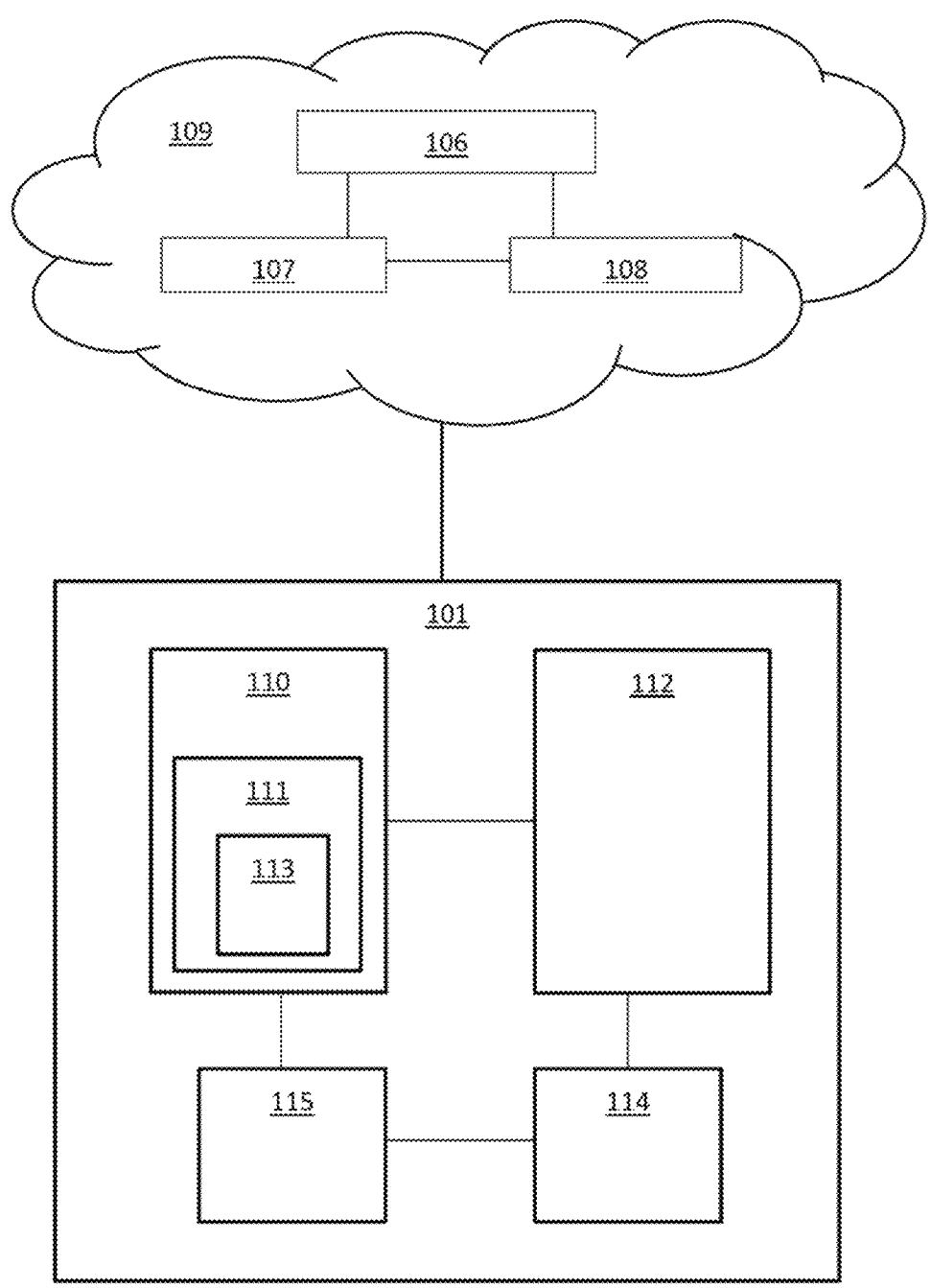
FIG. 2 is a schematic block diagram of an improved camera in accordance with the invention.

FIG. 2 shows an exemplary embodiment of an improved camera 101 in accordance with concepts of the present invention. In the illustrated embodiment, the camera 101 may include communication equipment 110 such as a network node, a network card, or a network circuit, etc. operating in, for example, a 5G communications system environment, although the improved camera 101 of the invention is not limited to operating in a 5G communications system but could include communication equipment 110 for operating in any suitable communications network 109.

The camera 101 may comprise a plurality of functional blocks for performing various functions thereof. For example, the camera 101 may include a transceiver module 111 for transmitting and receiving data signals from other smart city system entities. The transceiver module 111 provides signal processing and is configured to provide signals and/or information extracted therefrom to functional block module(s) 112 such as may comprise various data sink, control element(s), user interface(s), etc. Irrespective of the particular configuration of the transceiver module 111, embodiments include data processing, module 113 which may be disposed in association with the transceiver module 111 for facilitating accurate processing of data in accordance with the invention.

Although the data processing module 113 is shown as being deployed as part of the transceiver module 111 (e.g., comprising a portion of the transceiver module control and logic circuits), there is no limitation to such a deployment configuration according to the concepts of the invention. For example, the data processing module 113 may be deployed as a separate functional block of the camera 101 that is distinct from, but connected to, the transceiver module 111. The data processing module 113 may for example, be implemented using logic circuits and/or executable code/machine readable instructions stored in a memory 114 of the camera 101 for execution by a processor 115 to thereby perform functions as described herein. For example, the executable code/machine readable instructions may be stored in one or more memories 114 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 114 may comprise processor-readable memories for use with respect to one or more processors 115 operable to execute code segments of data processing module 113 and/or utilize data provided thereby to perform functions of the data processing module 113 as described herein. Additionally, or alternatively, the data processing module 113 may comprise one or more special purpose processors (e.g., application specific integrated circuit (ASIC), field programmable gate array (FPGA), graphics processing unit (GPU), and/or the like configured to perform functions of the data processing module 113 as described herein.

Figure 3:
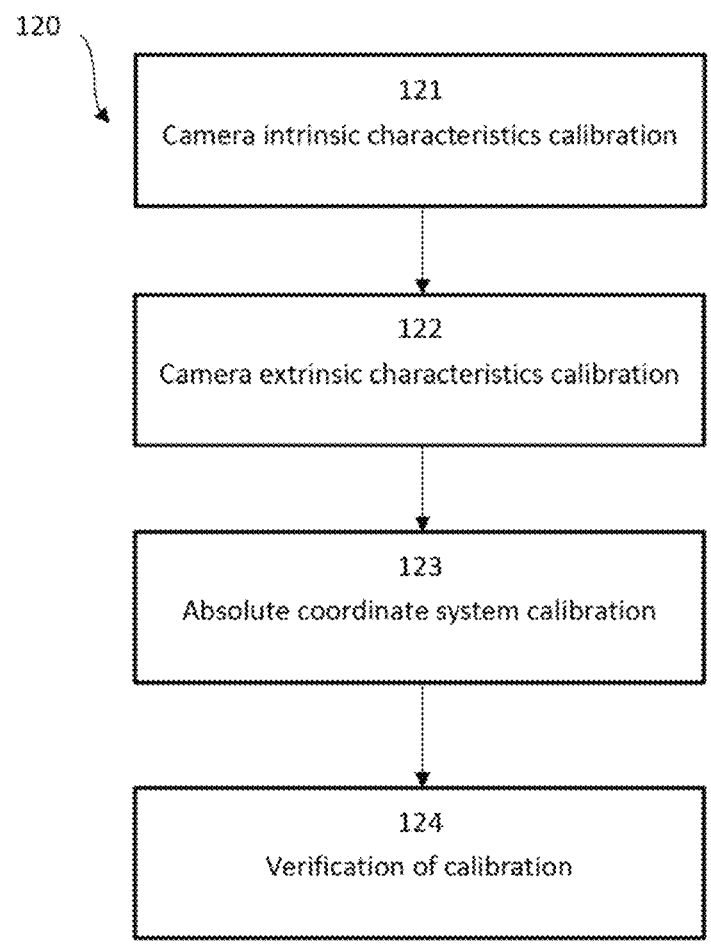
FIG. 3 is a flow chart of set of methods in accordance with the invention.

FIG. 3 is a flow chart of a set of methods 120 implemented by the data processing module 113 of the camera 101 in accordance with a first main aspect of the invention. The set of methods 120 comprises a first optional method 121 of calibrating the intrinsic characteristics of the camera 101. This method 121 calibrates the intrinsic characteristics of the camera 101 comprising one or more of the camera lens' focal length, the camera optical center, and optionally the coefficients of radial and tangential distortion of the camera lens, from which can be obtained a projective transformation of the camera 3D coordinate system to the camera 2D pixel coordinate system for the camera image view or captured images.

The set of methods 120 comprises a second optional method 122 of calibrating the extrinsic characteristics of the camera 101. This method 122 calibrates the extrinsic characteristics of the camera 101 by calibrating the 3D real-world coordinate system in the locality of the camera 101 with the 3D camera coordinate system.

The main non-optional method 123 of the invention comprises calibrating the relationship between the 3D real-world coordinate system in the locality of the camera 101 with an absolute 3D coordinate system as will be described below.

A final optional method 124 of the set of methods 120 comprises taking absolute position coordinates for a multiplicity of test points in the locality of the camera 101, i.e., within the camera image view, and comparing the absolute position coordinates to absolute position data calculated for corresponding point locations in image data captured by the camera 101.

Figure 4:
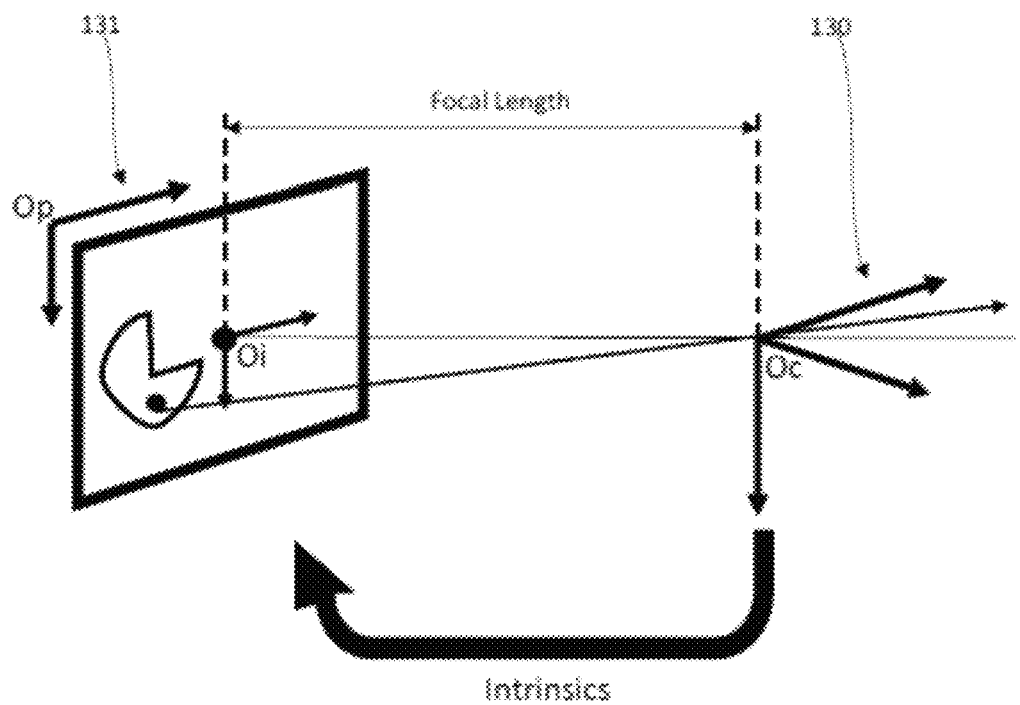
FIG. 4 illustrates the relationship between the camera 3D coordinate system and the camera 2D pixel coordinate system.

FIG. 4 illustrates the relationship between the camera 3D coordinate system 130 and the camera 2D pixel coordinate system 131. The main intrinsic characteristics of the camera 101 comprise the focal length of the camera lens in pixel units and the optical center of the camera also in pixel units. The camera intrinsic characteristics can be represented by a 3 by 3 matrix K:

$$K = \begin{bmatrix} f_x & 0 & c_x \\ 0 & f_y & c_y \\ 0 & 0 & 1 \end{bmatrix}$$

where
$[c_x, c_y]$ is the optical center (the principal point) in pixels; and
$[f_x, f_y]$ is the lens focal length in pixels The matrix K represents a projective transformation from the camera 3D coordinate system 130 to the camera 2D pixel coordinate system 131 and vice-versa. The matrix K, however, does not account for lens distortion so optionally calibrating the camera intrinsic characteristics may include adding distortion correction coefficients for one or both of radial distortion and tangential distortion. Radial distortion occurs when light rays bend more near the edges of the lens than at the optical center of the lens. Tangential distortion occurs when the lens and the image plane are not parallel. Both the radial distortion and the tangential distortion are non-linear. The relationships for correcting radial distortion comprise:

$$x_{distorted} = x(1 + k_1 * r^2 + k_2 r^4 + k_3 * r^6)$$

$$y_{distorted} = y(1 + k_1 * r^2 + k_2 r^4 + k_3 * r^6)$$

where x, y are the undistorted pixel locations;
$k_1, k_2, k_3$ are the radial distortion coefficients of the camera lens; and
$r^2 : x^2 + y^2$.

The relationships for correcting tangential distortion comprise:

$$x_{distorted} = x + [2 * p_1 * x * y + p_2 * (r^2 + 2 * x^2)]$$

$$y_{distorted} = y + [p_1 * (r^2 + 2 * y^2) + 2 * p_2 * x * y]$$

where x, y are the undistorted pixel locations,
$p_1, p_2$ are the tangential distortion coefficients of the camera lens; and
$r^2 : x^2 + y^2$.

Figure 5:
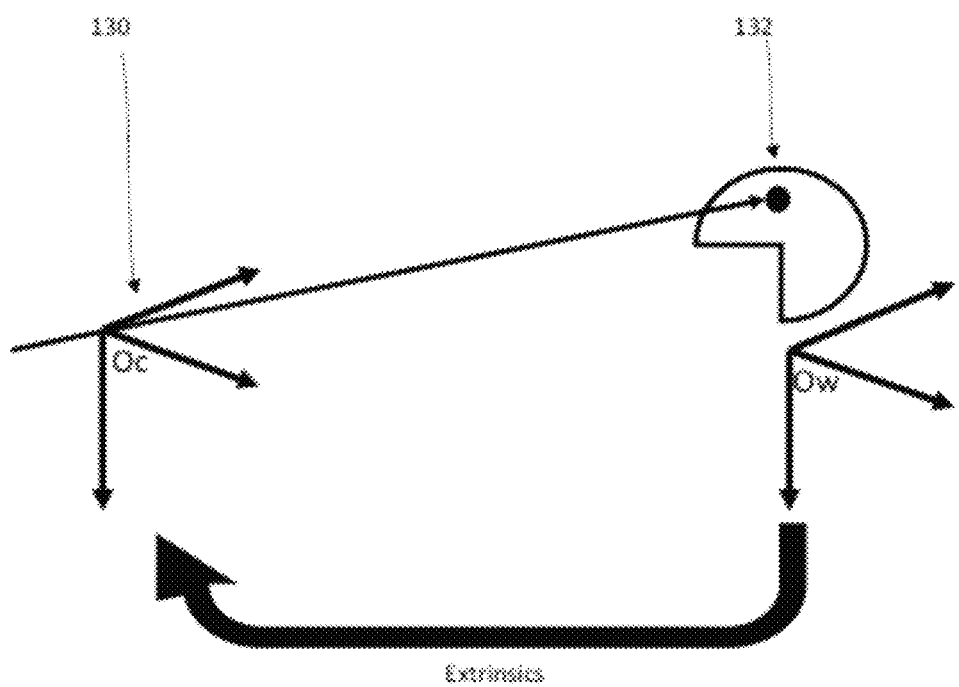
FIG. 5 illustrates the relationship between the 3D real-world coordinate system in the locality of the camera and the camera 3D coordinate system.

FIG. 5 illustrates the relationship between the real-world coordinate system 132 in the locality of the camera 101 and the camera 3D coordinate system 130. The camera extrinsic relationship comprises a 3 by 3 rotation matrix R and a 3 by 1 translation vector T. The origin of the camera's 3D coordinate system 130 is its optical center and its x-axis and its y-axis define the camera image plane. The 3 by 3 rotation matrix R and a 3 by 1 translation vector T are represented by the following matrix:

$$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}.$$
$$[R] \quad [T]$$

The camera intrinsic characteristics and the camera extrinsic characteristics can be combined to provide projection data or a projection matrix P to transform the real-world coordinate system 132 in the locality of the camera 101 to the camera 2D pixel coordinate system 131:

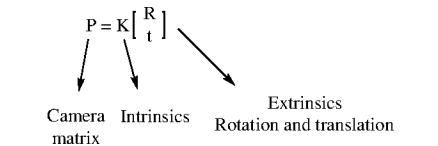

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

2D Image Coordinates — Intrinsic properties (Optical Centre, scaling) — Extrinsic properties (Camera Rotation and translation) — 3D World Coordinates The above camera projection matrix P does not include distortion correction, but distortion correction can be compensated as follows:

$$\begin{bmatrix} x \\ y \\ z \end{bmatrix} = R \begin{bmatrix} X \\ Y \\ Z \end{bmatrix} + t$$

$$x' = x/z$$

$$y' = y/z$$

$$x'' = x' \frac{1 + k_1 r^2 + k_2 r^4 + k_3 r^6}{1 + k_4 r^2 + k_5 r^4 + k_6 r^6} + 2 p_1 x' y' + p_2 (r^2 + 2 x'^2)$$

$$y'' = y' \frac{1 + k_1 r^2 + k_2 r^4 + k_3 r^6}{1 + k_4 r^2 + k_5 r^4 + k_6 r^6} + p_1 (r^2 + 2 y'^2) + 2 p_2 x' y'$$

where $r^2 = x'^2 + y'^2$ $$u = f_x * x'' + c_x$$

$$v = f_y * y'' + c_y$$

where x″ and y″ are the compensated camera image plane x and y values.

In the following description, it will be assumed that there is no lens distortion in the camera 101.

Figure 8:
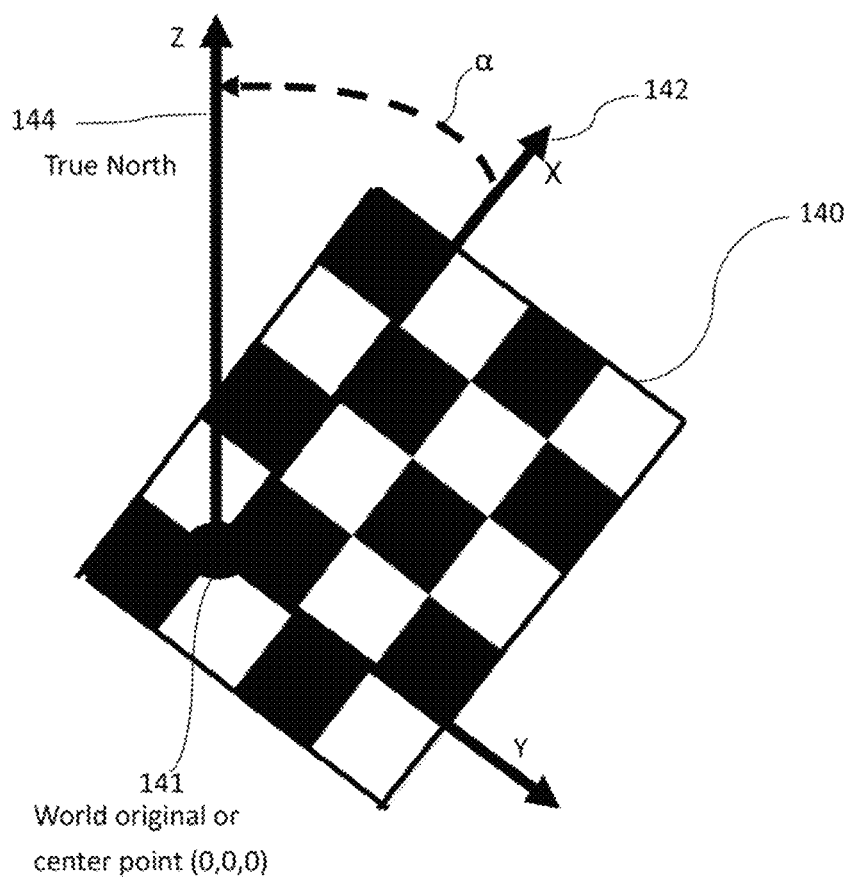
FIG. 8 illustrates the camera calibration method in accordance with the invention.

A preferred method 122 of determining the camera extrinsic characteristics uses a first patterned planar device 140 of known size placed preferably entirely within the image view of the camera 101 and preferably appearing in the image as large as possible. The method 122 determines the position and orientation of the camera 101 preferably with respect to a designated origin of the first patterned planar device 140 denoted as "World center (0,0,0)" in FIG. 8. The first patterned planar device 140 preferably comprises a first planar chessboard patterned device 140 which defines the 3D real-world coordinate system 132 in the locality of the camera 101 with axis Z=0. However, the chessboard pattern of the first planar chessboard patterned device 140 is only meaningful locally to the camera 101 and cannot be directly used to obtain absolute position data for selected points in the camera image view.

Figure 6:
FIG. 6 illustrates the method of obtaining the camera's extrinsic characteristics.

The preferred method 122 of determining the camera extrinsic characteristics assumes that the same camera 101 is also used for separately determining the camera's intrinsic characteristics as described below. The method 122, as illustrated in FIG. 6, comprises placing the first planar patterned chessboard device 140 on the ground within the camera's FOV, i.e., within the camera's image view, such that the whole first planar chessboard patterned device 140 is within the camera's FOV. The first planar chessboard patterned device 140 should be placed flat on the ground. Preferably, the first planar chessboard patterned device 140 has a size which is at least 150 pixels by 150 pixels in the camera's image view. This would typically be about 1.5 m by 1.5 m in a typical smart city surveillance camera scene 100. The method 122 includes taking at least one image of the first planar chessboard patterned device 140 with the camera 101. The elevation angle of the camera 101 is dependent on the region of interest (ROI) of the camera 101 for detection of objects 102 located within the camera's FOV. The elevation angle may be about 30°. The camera 101 may provide the captured image to the server 107 and/or the database 108. The overall square size in meters of the first planar chessboard patterned device 140 and its number of rows and columns are inputted to the camera 101 and/or to the server 107. The chessboard dimensions may have already been uploaded to the camera 101 and/or the server/database 107/108 before the imaging process of the first planar chessboard patterned device 140 is performed to thereby time it extrinsic characteristics calibration method 122. In any event, the extrinsic characteristics matrix $$\begin{bmatrix} R \\ t \end{bmatrix}$$

is determined from the captured image data and the dimensions data of the first planar chessboard patterned device 140 using any suitable camera extrinsic calibration method. A suitable tool for implementing the camera extrinsic calibration method is known as "OpenCV™" which comprises the publicly available Open Source Computer Vision Library. The OpenCV™ SolvePnP function may be used. The resulting extrinsic characteristics matrix $$\begin{bmatrix} R \\ t \end{bmatrix}$$

is saved to the camera 101 and/or the server/database 107/108.

Figure 7:
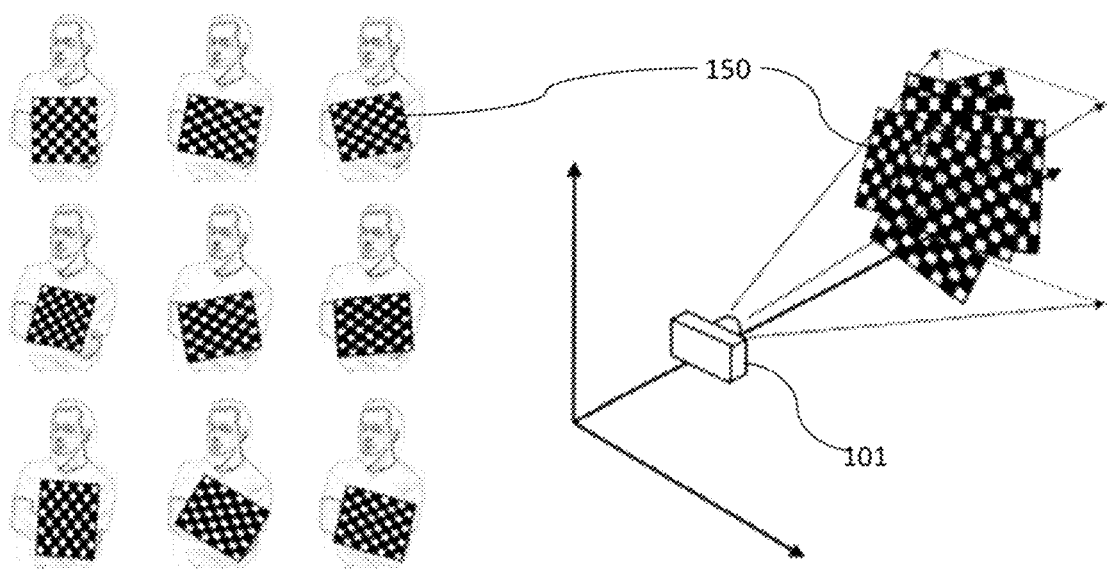
FIG. 7 illustrates the method of obtaining the camera's intrinsic characteristics.

The preferred method 121 of determining the camera intrinsic characteristics, as illustrated in FIG. 7, involves taking multiple images of a second planar patterned device 150 of smaller size than the first planar patterned device 140. The method may involve printing the second planar patterned device 150 comprising a second planar chessboard patterned device 150 on, for example, A4 sized paper or card. The method preferably involves taking multiple images of the second planar chessboard patterned device 150 with the camera 101 by placing car holding said second planar chessboard patterned device 150 in the camera's FOV at multiple different viewing angles and/or at multiple different distances from the camera 101. Preferably, as many as 20 to 30 images are obtained. The dimensions of the printed second planar chessboard patterned device 150 are stored in the camera 101 and/or the server/database 107/108 and this may be done in advance of the imaging step. The intrinsic characteristics matrix K is determined from a combination of the captured image data and the dimensions data of the second planar chessboard patterned device 150 using any suitable camera intrinsic calibration method. A suitable tool for implementing the camera intrinsic calibration method 121 is the OpenCV™ calibrate camera function. The resulting intrinsic characteristics matrix K is saved to the camera 101 and/or the server/database 107/108.

The preferred method 122 of determining the camera extrinsic characteristics and the preferred method 121 of determining the camera intrinsic characteristics are, as indicated above, optional methods if the intrinsic and extrinsic characteristics of the camera 101 are not already known. Furthermore, any suitable methods for obtaining the intrinsic and extrinsic characteristics of the camera 101 could be implemented.

The key, non-optional method 123 in accordance with the invention is the method of modifying the projection matrix P to make it suitable for transforming the 2D pixel coordinate system 131 of the camera image view to a 3D global geographical coordinate system for point locations within the image view of the camera, i.e., to an absolute positioning system or absolute coordinate system comprising a one-to-one transformation for mapping to the Z=0 plane of the 3D real-world coordinate system.

The method 123 should use the same first planar chessboard patterned device 140 as used in the method 122 for determining the camera extrinsic characteristics. The measurements for the method 123 are simple and can be completed in a short time of typically less than one minute. The method 123 comprises measuring absolute coordinates for a selected point location, i.e., the origin of the chessboard coordinate system, within the image view of the camera 101. The selected point location should be a selected corner point 141 on the first planar chessboard patterned device 140 and is preferably an internal corner point 141 on said planar chessboard patterned device 140, i.e., not a physical external corner point of the device 140 but a corner point 141 in the chessboard pattern of the device 140 as exemplified by FIG. 8. The selected corner point 141 can be considered as the 'world center' or origin point [0, 0, 0] for the 3D real-world coordinate system in the locality of the camera 101. The absolute coordinates, i.e., the global geographical coordinates, of the origin point [0, 0, 0] may be measured using any suitable global position device such as a real-time kinematic (RTK) device.

In addition to obtaining the absolute coordinates of the origin point [0, 0, 0], the method 123 includes measuring an angle a between an x-axis 142 of the real-world coordinate system with respect to true north 144, said x-axis 142 passing through said origin point [0, 0, 0]. Preferably, the method 123 involves measuring an anti-clockwise angle $\alpha$ with respect to true north. The angle $\alpha$ may be measured using any suitable compass device such as an e-compass device in which the angle measurement error is preferably less than 0.5 degree.

The method 123 further comprises using said obtained absolute coordinates of the origin point [0, 0, 0], the measured angle $\alpha$, and projection data derived from the intrinsic and extrinsic characteristics of the camera 101 to derive modified projection data for transforming the 2D pixel coordinate system 131 of the camera image view into the 3D geographical coordinate system to enable global geographical coordinates to be derived for any selected point location, i.e., pixel position, within the image view of the camera 101 or within an image captured by the camera 101.

The method 123 thereby changes the earlier described camera projection matrix P into a modified or integrated projection matrix P' which enables pixel positions in the 2D pixel coordinate system 131 of the camera 101 to be transformed or converted into global geocentric or geographical coordinates in the 3D absolute position system.

The method 123 uses a first rotation matrix based on the measured angle $\alpha$ and a second rotation matrix based on the measured latitude and longitude geographical coordinates of the origin point [0, 0, 0 ] to modify the camera projection matrix P to obtain the integrated projection matrix P'.

The camera projection matrix P as shown again below enables a 3D real-world coordinate [X Y Z], namely the coordinate system of the first planar patterned chessboard device 140, to be converted to a 2D pixel position [u, v] on the camera image view or image data in the locality of the camera 101.

Camera projection matrix P (assuming no camera lens distortion) comprises:

$$s\begin{bmatrix}u\\v\\1\end{bmatrix} = \begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

When the Z value in the 3D real-world coordinate system in the locality of the camera 101 is taken as zero, there is a one-to-one relationship or solution from pixel positions in the camera image view or image data to the 3D real-world coordinate system in the locality of the camera 101.

With Z set to zero and expanding the $3^{rd}$ row of the camera projection matrix P, this can be expressed as:

$$S = r_{13}*t_1 + r_{23}*t_2 + r_{33}*t_3/r_{13}*u + r_{23}*v + r_{33}*1.0$$

This expression cab be rewritten as:

$$s\begin{pmatrix}u\\v\\1\end{pmatrix} = KR\begin{pmatrix}X\\Y\\0\end{pmatrix} + T \Rightarrow KR^{-1}\left[s\begin{pmatrix}u\\v\\1\end{pmatrix} - T\right] = \begin{pmatrix}X\\Y\\0\end{pmatrix}$$

such that a unique X, Y position in the 3D real-world coordinate system can be solved for a 2D pixel position [u, v] on the camera image view or image data.

The camera projection matrix P is then modified in method 123 to the integrated projection matrix P' by the first and second rotation matrices as follows:

$$\begin{pmatrix}XE\\YE\\ZE\end{pmatrix} = \begin{bmatrix}-\sin(\phi)\cos(\lambda) & -\sin(\lambda) & -\cos(\phi)\cos(\lambda)\\-\sin(\phi)\sin(\lambda) & \cos(\lambda) & -\cos(\phi)\sin(\lambda)\\\cos(\phi) & 0 & -\sin(\phi)\end{bmatrix}\begin{pmatrix}\cos(a) & \sin(a) & 0\\-\sin(a) & \cos(a) & 0\\0 & 0 & 1\end{pmatrix}\begin{pmatrix}XC\\YC\\ZC\end{pmatrix} + PRef$$

First rotation matrix    Second rotation matrix where [XE, YE, ZE] represents the 3D absolute coordinate system (global geocentric or geographical coordinate system), [XC, YC, ZC] represents the 3D real-world coordinate system in the locality of the camera 101 and PRef is the absolute coordinate position of the origin point [0, 0, 0].

As:

$$\begin{pmatrix} XC \\ YC \\ 0 \end{pmatrix} = KR^{-1}\left[s\begin{pmatrix} u \\ v \\ 1 \end{pmatrix} - T\right]$$

then the integrated projection matrix P' can be expressed as:

$$\begin{pmatrix} XE \\ YE \\ ZE \end{pmatrix} = \begin{bmatrix} -\sin(\phi)\cos(\lambda) & -\sin(\lambda) & -\cos(\phi)\cos(\lambda) \\ -\sin(\phi)\sin(\lambda) & \cos(\lambda) & -\cos(\phi)\sin(\lambda) \\ \cos(\phi) & 0 & -\sin(\phi) \end{bmatrix}$$
$$\begin{pmatrix} \cos(a) & \sin(a) & 0 \\ -\sin(a) & \cos(a) & 0 \\ 0 & 0 & 1 \end{pmatrix} KR^{-1}\left[s\begin{pmatrix} u \\ v \\ 1 \end{pmatrix} - T\right] + PRef$$

The integrated projection matrix P' makes it possible to find 3D absolute coordinates for any 2D pixel position [u, v] on the camera image view or image data system in the locality of the camera.

in the foregoing, the 3D absolute coordinates may be geocentric coordinates according to the Earth-centered, Earth-fixed (ECEF) coordinate system as will be more fully described below, but the method 123 preferably includes a final transformation of the ECEF coordinate system to a truly global geographical coordinate system such as the World Geodetic System 1984 (WGS84), although any absolute geographical coordinate system can be used.

As described above, the camera projection matrix P enables a 2D pixel position [u, v] on the camera image view or image data to be converted to the 3D real-world coordinate system in the locality of the camera 101, namely the coordinate system of the first planar patterned chessboard device 140 when the constraint Z=0 is applied. The method 123 modifies the camera projection matrix P to provide an integrated camera projection matrix P' to enable a 2D pixel position [u, v] on the camera image view or image data to be converted to a 3D global geocentric or geographical position system, i.e., an absolute position system.

The method 123 preferably comprises firstly transforming the 3D real-world coordinate system in the locality of the camera 101, namely the coordinate system of the first planar patterned chessboard device 140, to an intermediary coordinate system such as the North-East-Down (NED) coordinate system, The NED coordinate system is the nearest coordinate system to that of the first planar patterned chessboard device 140 since they both occupy a tangential plane to the earth. These two coordinate systems differ by just a rotation in the Z-axis (down axis). Consequently, converting or transforming the coordinate system of the first planar patterned chessboard device 140 to the NED coordinate system makes it easier to then convert or transform to other absolute coordinate systems such as the ECEF geocentric coordinate system and/or the WGS84 global geographical coordinate system.

The method 123 preferably also comprises transforming the intermediary coordinate system, e.g., the NED coordinate system to the ECEF coordinate system. This is because the NED coordinate system is a relative coordinate system whereas ECEF is an absolute Euclidean coordinate system which has been found to be a good stepping-stone for further converting to a commonly used global geographical coordinate system such as WGS84. WGS84 is preferred as it is the most commonly used global geographical coordinate system.

The NED coordinate system is a right-handed local tangent plane coordinate system on the Earth's surface. In the NED coordinate system, the normal, i.e., "Down" points to the Earth's center and north points to the true North/geodetic north, namely the direction along the Earth's surface towards the geographic North Pole. For a flat small area such as that of the first planar patterned chessboard device 140, the Earth's surface can be considered as planar or horizontal from a local point of view. Consequently, at this scale, the tangent plane is essentially the same as the true surface of the Earth. In view of this, the first planar patterned chessboard device 140 comprises a local tangent plane to the Earth's surface. The conversion or transformation of the 3D real-world coordinate system in the locality of the camera 101 to the NED coordinate system comprises a rotation transformation on the Z-axis (Down-axis) based on the angular difference between the x-axis 142 and true north 144. In other words, conversion or transformation of the 3D real-world coordinate system in the locality of the camera 101 to the NED coordinate system comprises a rotation transformation derived from the measured angle α which provides the first rotation matrix referred to in the foregoing. The first rotation matrix is given by:

$$\begin{pmatrix} \cos(a) & \sin(a) & 0 \\ -\sin(a) & \cos(a) & 0 \\ 0 & 0 & 1 \end{pmatrix}$$

The method 123 preferably also comprises transforming the NED coordinate system to the ECU coordinate system The NED coordinate system and the ECEF coordinate system are Euclidean coordinate systems which differ by a rigid transform comprising both rotation and translation. Consequently, converting from the NED coordinate system to the ECEF coordinate system is based on the following relationship:

$$P_{ECEF} = R\, P_{NED} + P_{REF}$$

$$R = \begin{bmatrix} -\sin(\phi)\cos(\lambda) & -\sin(\lambda) & -\cos(\phi)\cos(\lambda) \\ -\sin(\phi)\sin(\lambda) & \cos(\lambda) & -\cos(\phi)\sin(\lambda) \\ \cos(\phi) & 0 & -\sin(\phi) \end{bmatrix}$$

where $P_{NED}$ is a 3D position in the NED system, $P_{ECEF}$ is the corresponding ECEF position, $P_{Ref}$ is the reference ECEF position, i.e., the ECEF coordinate, position of the origin point [0, 0, 0] of the of the first planar patterned chessboard device 140, and R is the second rotation matrix whose columns comprise "north", "east", and "down" axes. R is the matrix of the measured latitude $\phi$ and longitude $\lambda$ geographical coordinates for $P_{Ref}$.

The transformation from the 3D real-world coordinate system in the locality of the camera 101 [XC, YC, ZC] to the ECEF coordinate system (XE, YE, ZE) can be integrated into the following formula:

$$\begin{pmatrix} XE \\ YE \\ ZE \end{pmatrix} = \begin{bmatrix} -\sin(\phi)\cos(\lambda) & -\sin(\lambda) & -\cos(\phi)\cos(\lambda) \\ -\sin(\phi)\sin(\lambda) & \cos(\lambda) & -\cos(\phi)\sin(\lambda) \\ \cos(\phi) & 0 & -\sin(\phi) \end{bmatrix}$$

$$\begin{pmatrix} \cos(a) & \sin(a) & 0 \\ -\sin(a) & \cos(a) & 0 \\ 0 & 0 & 1 \end{pmatrix} \begin{pmatrix} XC \\ YC \\ ZC \end{pmatrix} + T$$

where α is the measured angle between the x-axis 142 of the 3D real-world coordinate system and true north 144 in an anti-clockwise direction; ϕ and λ are the latitude and longitude geographical coordinates measured by the RTK device at the origin point [0, 0, 0] of the first planar patterned chessboard device 140; and T=$P_{Ref}$ which comprises the ECEF coordinates of the origin point [0, 0, 0].

In practice, it has been found to be easier to measure T using a WGS84 device and then converting the obtained global geographical coordinates to ECEF coordinates.

Finally, the method 123 preferably includes converting or transforming the ECEF coordinate system to preferably a widely used global coordinate system such as WGS84. The ECEF coordinate system is a Euclidean coordinate system with a one-to-one non-linear mapping with WGS84, which is a polar coordinate system. Conversion from the ECEF coordinate system to WGS84 may be calculated by the closed form algorithm published by JiJie Zhu in 1993. Third party software like MATLAB® or pymap3d provide a suitable API for the conversion. The integrated camera projection matrix P' can therefore be further modified to include the conversion from the ECEF coordinate system to WGS84 in accordance with the following:

$$\begin{pmatrix} Lat \\ Lon \\ Alt \end{pmatrix} = \text{eccef\_to\_wgs84}\left( \begin{bmatrix} -\sin(\phi)\cos(\lambda) & -\sin(\lambda) & -\cos(\phi)\cos(\lambda) \\ -\sin(\phi)\sin(\lambda) & \cos(\lambda) & -\cos(\phi)\sin(\lambda) \\ \cos(\phi) & 0 & -\sin(\phi) \end{bmatrix} \begin{pmatrix} \cos(a) & \sin(a) & 0 \\ -\sin(a) & \cos(a) & 0 \\ 0 & 0 & 1 \end{pmatrix} KR^{-1} \left[ s \begin{pmatrix} u \\ v \\ 1 \end{pmatrix} - T \right] + PRef \right)$$

which can be rewritten as:

$$\begin{pmatrix} Lat \\ Lon \\ Alt \end{pmatrix} = \text{eccef\_to\_wgs84}\left( P_{3\times 4} \begin{pmatrix} u \\ v \\ 1 \end{pmatrix} \right).$$

The set of methods 120 may include the further optional method 124 of verifying the camera calibration, Preferably, the same first planar chessboard patterned device 140 is used for the verification method 124 or several copies of the same first planar chessboard patterned device 140 are used.

Figure 9:
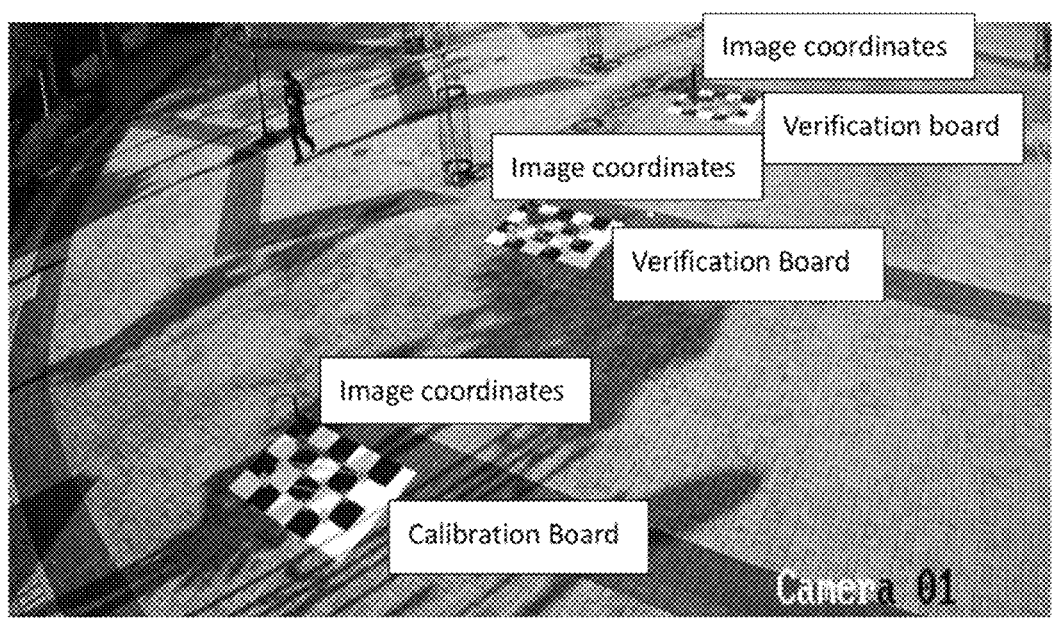
FIGS. 9 and 10 illustrate the calibration verification method in accordance with the invention.
Figure 10:
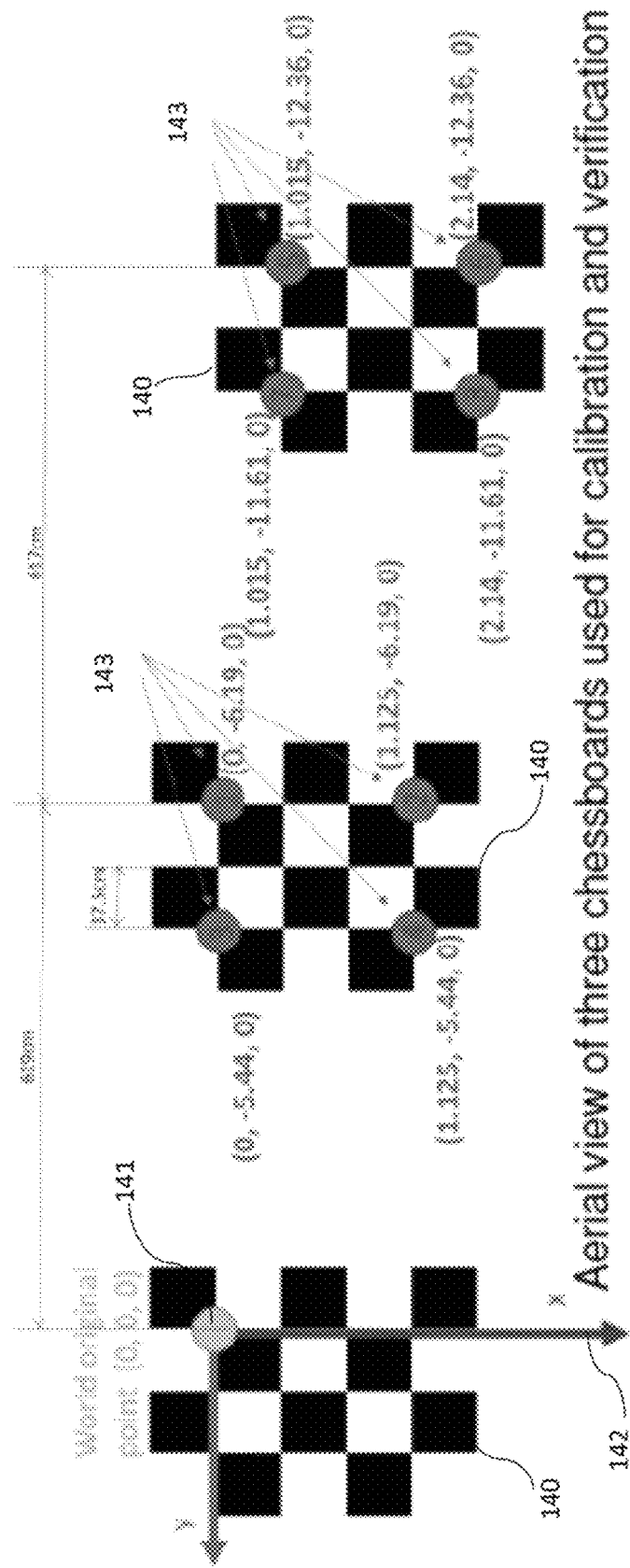

As shown in FIG. 9, two additional first planar chessboard patterned devices 140 are placed at different distances from the camera 101 within the camera's FOV. It is preferred that the surroundings have minimal blockage of GPS signals in order to obtain the most accurate global geographical coordinates for the test points as "ground-truth". The method 124 includes, as depicted in FIG. 10, identifying multiple points comprising corner points 143 as test points (denoted as 1 to 8 in FIG. 10) in each of the additional two first planar chessboard patterned devices 140. For each test point 143, the global geographical coordinates are obtained using, for example, the RTK device or a similar such device which can obtain GPS preferably with an error no more than 1.5 cm. Furthermore, from the camera image view or image data, the pixel positions for each of said test points 143 is obtained and the pixel positions are converted to absolute position data, i.e., to WGS84 geographical coordinates. The geographical coordinates obtained for the test points 143 using the RTK device are compared to the geographical coordinates obtained for the test points 143 from the pixel positions in the camera image view or image data. From the comparison, a determination can be made of any projection error occurring between the physically measured geographical coordinates obtained for the test points 143 and the geographical coordinates obtained for the test points 143 from pixel positions in the camera image view or image data to thereby verify the accuracy of the camera calibration under method 123. The amount of any projection errors may be dependent the positioning accuracy required for a related application.

Preferably, the test points 143 comprise internal corner points in the two additional first planar chessboard patterned devices 140. Corner points are preferred as they are easier to detect but other patterns or shapes such as circular dots are also possible using a suitable image processing algorithm to detect them with subpixel accuracy. The corner points may be detected using the Harris corner detection algorithm or any other suitable corner detection algorithm.

The present invention also provides a method of determining geographical coordinates for a point location within an image view of a camera comprising the steps of, obtaining an image from the camera; selecting a point location in the image in which the point is lying in the same plane as the first planar chessboard patterned device; obtaining two-dimensional pixel coordinates for said selected point location in the image; and transforming said two-dimensional pixel coordinates for said selected point location in the image into three-dimensional geographical coordinates for said selected point location using projection data mapping a two-dimensional pixel coordinate system of the camera image view into a three-dimensional geographical coordinate system.

The present invention also provides a camera comprising: a memory storing machine-readable instructions; and a processor for executing the machine-readable instructions such that, when the processor executes the machine-readable instructions, it configures the camera to implement the aforesaid methods in accordance with the invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at tunes be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplar embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of calibrating a camera comprising the steps of:
    obtaining geographical coordinates of a selected point location within an image view of the camera by placing a first patterned planar device of known size within the image view of the camera and selecting a point on said first patterned planar device as the selected point location within the image view of the camera, wherein said first patterned planar device defines a three-dimensional real-world coordinate system of the selected point location;
    measuring an angle between an x-axis of the three-dimensional real-world coordinate system with respect to true north, said x-axis passing through said selected point location; and
    using said obtained geographical coordinates, said measured angle, and projection data derived from characteristics of the camera to derive modified projection data for transforming a two-dimensional pixel coordinate system of the camera image view into a three-dimensional geographical coordinate system for point locations within the image view of the camera, said projection data comprising a projection matrix of the camera which transforms the three-dimensional real-world coordinate system of said selected point location to said two-dimensional pixel coordinate system of the camera image view, the projection matrix being derived from a combination of intrinsic camera characteristics and extrinsic camera characteristics, and said modified projection data is derived by modifying the projection matrix with a first rotation matrix based on the measured angle and a second rotation matrix based on the geographical coordinates of the selected point location to provide an integrated projection matrix;
    wherein the three-dimensional geographical coordinate system for point locations within the image view of the camera comprises an earth-center, earth fixed (ECEF) coordinate system and the combination of the first rotation matrix and the second rotation matrix of the integrated projection matrix transforms the three-dimensional real-world coordinate system of said selected point location to said ECEF coordinate system; and
    wherein the method includes obtaining intrinsic characteristics of the camera from a second patterned planar device of known size by imaging said second patterned planar device in multiple different angles and/or different distances within the image view of the camera to obtain an intrinsic characteristics matrix for the camera, the intrinsic characteristics matrix comprising a projective transformation of a three-dimensional coordinate system of the camera image view to the two-dimensional pixel coordinate system of the camera image view.

2. The method of claim 1 wherein the first rotation matrix transforms the three-dimensional real-world coordinate system to a North-East-Down (NED) coordinate system and the second rotation matrix transforms the NED coordinate system to the ECEF coordinate system.

3. The method of claim 1, wherein the method includes modifying the integrated projection matrix to transform the ECEF coordinate system to a absolute coordinate system.

4. The method of claim 1, wherein the step of obtaining geographical coordinates for said selected point location comprises using a real-time kinematic (RTK) device.

5. The method of claim 1, wherein the second patterned planar device of known size is smaller than the first patterned planar device.

6. The method of claim 1, wherein the method includes obtaining extrinsic characteristics of the camera from the first patterned planar device to obtain an extrinsic characteristics matrix for the camera comprising rotation and translation vectors, the extrinsic characteristics matrix comprising a transformation of the three-dimensional real-world coordinate system of the selected point location to the three-dimensional coordinate system of the camera image view.

7. The method of claim 6, wherein the projection matrix derived from characteristics of the camera comprises a matrix multiplication product of the intrinsic characteristics' matrix and the extrinsic characteristics' matrix.

8. The method of claim 1, wherein the method includes obtaining geographical coordinates for multiple point locations on the first patterned planar device using a RTK device; detecting said multiple point locations on the first patterned planar device in the image view of the camera; using the integrated projection matrix to determine corresponding geographical coordinates for each of said detected multiple point locations in the image view of the camera; and comparing the obtained geographical coordinates using the RTK device with the calculated geographical coordinates using the integrated projection matrix to determine any projection errors between the obtained geographical coordinates using the RTK device and the calculated geographical coordinates using the integrated projection matrix.

9. The method of claim 8, wherein calibration of the camera is verified or not verified dependent on an amount of any projection errors.

10. The method of claim 8, wherein the step of detecting said multiple point locations on the first patterned planar device comprises detecting corner point locations on said first patterned planar device.

11. The method of claim 8, wherein the step of detecting said multiple point locations on the first patterned planar device includes placing said first patterned planar device at different distances from the camera within the image view of the camera and repeating the steps of claim 7 for each different distance.

12. A camera comprising:
- a memory storing non-transitory machine-readable instructions; and
- a processor for executing the non-transitory machine-readable instructions such that, when the processor executes the non-transitory machine-readable instructions, the non-transitory machine-readable instructions configure the camera to:
- receive data comprising geographical coordinates of a selected point location within an image view of the camera by selecting a point on a first patterned planar device of known size placed within the image view of the camera, wherein said first patterned planar device defines a three-dimensional real-world coordinate system of the selected point location;
- receive data comprising a measured angle between an x-axis of a three-dimensional real-world coordinate system with respect to true north, said x-axis passing through said selected point location; and
- using said received data comprising the geographical coordinates, said received data comprising the measured angle, and projection data derived from characteristics of the camera to derive modified projection data for transforming a two-dimensional pixel coordinate system of the camera image view into a three-dimensional geographical coordinate system for point locations within the image view of the camera, said projection data comprising a projection matrix of the camera which transforms the three-dimensional real-world coordinate system of said selected point location to said two-dimensional pixel coordinate system of the camera image view, the projection matrix being derived from a combination of intrinsic camera characteristics and extrinsic camera characteristics, and said modified projection data is derived by modifying the projection matrix with a first rotation matrix based on the measured angle and a second rotation matrix based on the geographical coordinates of the selected point location to provide an integrated projection matrix;
- wherein the three-dimensional geographical coordinate system for point locations within the image view of the camera comprises an earth-center, earth fixed (ECEF) coordinate system and the combination of the first rotation matrix and the second rotation matrix of the integrated projection matrix transforms the three-dimensional real-world coordinate system of said selected point location to said ECEF coordinate system; and
- wherein the intrinsic characteristics of the camera is obtained from a second patterned planar device of known size by imaging said second patterned planar device in multiple different angles and/or different distances within the image view of the camera to obtain an intrinsic characteristics matrix for the camera, the intrinsic characteristics matrix comprising a projective transformation of a three-dimensional coordinate system of the camera image view to the two-dimensional pixel coordinate system of the camera image view.

\* \* \* \* \*